US 11,137,993 B2

(12) United States Patent
Ohta et al.

(10) Patent No.: US 11,137,993 B2
(45) Date of Patent: Oct. 5, 2021

(54) IMAGING DEVICE

(71) Applicant: HITACHI AUTOMOTIVE SYSTEMS, LTD., Hitachinaka (JP)

(72) Inventors: Akira Ohta, Hitachinaka (JP); Rikiya Kashimura, Hitachinaka (JP); Yoshiyuki Muto, Hitachinaka (JP)

(73) Assignee: HITACHI AUTOMOTIVE SYSTEMS, LTD., Hitachinaka (JP)

(*) Notice: Subject to any disclaimer, the term of this patent is extended or adjusted under 35 U.S.C. 154(b) by 112 days.

(21) Appl. No.: 16/471,754

(22) PCT Filed: Dec. 19, 2017

(86) PCT No.: PCT/JP2017/045439
§ 371 (c)(1),
(2) Date: Jun. 20, 2019

(87) PCT Pub. No.: WO2018/128074
PCT Pub. Date: Jul. 12, 2018

(65) Prior Publication Data
US 2020/0089486 A1 Mar. 19, 2020

(30) Foreign Application Priority Data
Jan. 6, 2017 (JP) .............................. JP2017-000864

(51) Int. Cl.
G06F 8/65 (2018.01)
G01S 17/93 (2020.01)
(Continued)

(52) U.S. Cl.
CPC ............... G06F 8/65 (2013.01); B60W 30/08 (2013.01); G01S 17/93 (2013.01); G06F 8/61 (2013.01);
(Continued)

(58) Field of Classification Search
CPC ..... G06F 8/65; G06F 8/61; G06F 8/71; G06F 21/57; B60W 30/08; G01S 17/83; G08G 1/16
See application file for complete search history.

(56) References Cited

U.S. PATENT DOCUMENTS 5,951,619 A * 9/1999 Merl .................... G05B 19/042
701/115
2007/0152804 A1* 7/2007 Breed .................. B60W 30/16
340/435
(Continued)

FOREIGN PATENT DOCUMENTS

JP 2012-028868 A 2/2012
JP 2012-162130 A 8/2012
(Continued)

OTHER PUBLICATIONS

International Search Report with English translation and Written Opinion issued in corresponding application No. PCT/JP2017/045439 dated Apr. 10, 2018.
(Continued)

Primary Examiner — Ziaul A Chowdhury
(74) Attorney, Agent, or Firm — Foley & Lardner LLP

(57) ABSTRACT

The purpose of the present invention is to provide an imaging device capable of quickly providing functionality which contributes to improved safety. The present invention is characterized: by comprising an imaging unit that performs imaging, a software program storage unit that stores a plurality of software programs, and a start unit that starts each of the plurality of software programs stored in the software program storage unit; and in that at least one of the plurality of software programs is a software program that contributes to improvement of safety, and the start unit
(Continued)

prioritizes the start of the software program contributing to improvement of safety over the other programs.

10 Claims, 7 Drawing Sheets

(51) Int. Cl.
  *G06F 8/71*   (2018.01)
  *G06F 21/57*   (2013.01)
  *G08G 1/16*   (2006.01)
  *B60W 30/08*   (2012.01)
  *G06F 8/61*   (2018.01)

(52) U.S. Cl.
  CPC ................ *G06F 8/71* (2013.01); *G06F 21/57* (2013.01); *G08G 1/16* (2013.01)

(56) References Cited

U.S. PATENT DOCUMENTS

| | | | |
|---|---|---|---|
| 2010/0107246 A1* | 4/2010 | Ohta | G06F 21/575 726/22 |
| 2011/0205042 A1 | 8/2011 | Takemura | |
| 2012/0216208 A1 | 8/2012 | Takemura | |
| 2014/0089651 A1* | 3/2014 | Yao | H04L 63/0853 713/2 |
| 2016/0304040 A1* | 10/2016 | Narisawa | G06F 9/524 |
| 2018/0204462 A1* | 7/2018 | Tomescu | B60W 30/18027 |

FOREIGN PATENT DOCUMENTS

| | | |
|---|---|---|
| WO | WO-2010/038851 A1 | 4/2010 |
| WO | WO-2011/055581 A1 | 5/2011 |

OTHER PUBLICATIONS

Office Action issued in corresponding Japanese Patent Application No. 2018-560353 dated Feb. 18, 2020, with English translation.

* cited by examiner

FIG. 7

| MANAGEMENT INFORMATION | | PRIORITY INCREASED/DECREASED CONDITION | STATE | FUNCTIONALITY 1 | FUNCTIONALITY 2 | FUNCTIONALITY 3 | FUNCTIONALITY 4 | FUNCTIONALITY 5 | FUNCTIONALITY 6 |
|---|---|---|---|---|---|---|---|---|---|
| | | PRIORITY DEFAULT VALUE | | 1 | 1 | 1 | 1 | 1 | 1 |
| PRIORITY DEFINITION INFORMATION | WHETHER FUNCTIONALITY IS NECESSARY FOR SYSTEM OPERATION OF STEREO CAMERA | (NECESSARY: −6) | − | UNNECESSARY | UNNECESSARY | UNNECESSARY | UNNECESSARY | NECESSARY (−6) | NECESSARY (−6) |
| | WHETHER FUNCTIONALITY IS ESSENTIAL FOR ACCIDENT PREVENTION/WHETHER FUNCTIONALITY IS FOR COMFORTABLE DRIVING | (COMFORT: +2) | − | COMFORT | ESSENTIAL | COMFORT (+2) | COMFORT (+2) | ESSENTIAL | ESSENTIAL |
| PERIPHERAL IN-VEHICLE DEVICE INFORMATION | WHETHER FUNCTIONALITY WORK DURING TRAVELING OR WHETHER FUNCTIONALITY WORK DURING STOPPAGE | ACQUIRE VELOCITY INFORMATION FROM PERIPHERAL DEVICE CASE OF BEING STOPPED (TRAVELING: +3) CASE OF TRAVELING (NOT INCREASED/DECREASED) | STOPPED | TRAVELING (+3) | BOTH | STOPPAGE | TRAVELING (+3) | STOPPAGE | BOTH |
| | WHETHER FUNCTIONALITY DO NOT NEED TO BE PERFORMED IN CASE WHERE TEMPERATURE IS IN PRESCRIBED RANGE | ACQUIRE TEMPERATURE INFORMATION FROM PERIPHERAL DEVICE CASE OF HIGH TEMPERATURE (NOT INCREASED/DECREASED) CASE OF BEING IN RANGE (UNNECESSARY: +12) | IN RANGE | NECESSARY | NECESSARY | NECESSARY | NECESSARY | NECESSARY | UNNECESSARY (+12) |
| CAMERA IMAGE ANALYSIS PROCESSING | WHETHER FUNCTIONALITY WORK DURING DAY WHETHER FUNCTIONALITY WORK AT NIGHT | DETERMINE DAY/NIGHT ACCORDING TO CAMERA IMAGE CASE OF BEING DURING DAY (ONLY AT NIGHT: +6) CASE OF BEING AT NIGHT (NOT INCREASED/DECREASED) | DAYTIME | BOTH | BOTH | BOTH | ONLY AT NIGHT (+6) | BOTH | BOTH |
| | WHETHER FUNCTIONALITY IS NECESSARY WHEN IT IS FOGGY/RAINY | DETERMINE FOG/RAIN ACCORDING TO CAMERA IMAGE CASE OF BEING FOGGY (FOG NECESSARY: −2) CASE OF BEING RAINY (RAIN NECESSARY: −2) OTHER CASE (NOT INCREASED/DECREASED) | OTHER | | | | FOG NECESSARY | | |
| | WHETHER PROCESSING DO NOT NEED TO BE PERFORMED WHEN THERE IS NO NOISE IN IMAGE | DETERMINE NOISE ACCORDING TO CAMERA IMAGE CASE WHERE THERE IS NOISE (NOT INCREASED/DECREASED) CASE WHERE THERE IS NO NOISE (UNNECESSARY: +12) | NONE | NECESSARY | NECESSARY | NECESSARY | NECESSARY | NECESSARY | UNNECESSARY (+12) |
| PREVIOUS RECOGNITION STORED INFORMATION | WHETHER FUNCTIONALITY CAN HAVE LOW PRIORITY WHEN OBSTACLE INFORMATION STORED IN PREVIOUS DRIVING IS VALID | DETERMINE VALIDITY ACCORDING TO STORED INFORMATION CASE OF BEING VALID (OMISSION IS POSSIBLE: +2) CASE OF BEING INVALID (NOT INCREASED/DECREASED) | INVALID | OMISSION IS POSSIBLE | | | | | |
| | WHETHER FUNCTIONALITY CAN HAVE LOW PRIORITY WHEN SIGN INFORMATION STORED IN PREVIOUS DRIVING IS VALID | DETERMINE VALIDITY ACCORDING TO STORED INFORMATION IN CASE OF BEING VALID (OMISSION IS POSSIBLE: +2) CASE OF BEING INVALID (NOT INCREASED/DECREASED) | VALID | | | | OMISSION IS POSSIBLE (+2) | | |
| | | PRIORITY DETERMINATION RESULT | | 4 | 1 | 5 | 12 | −5 | 19 |

IMAGING DEVICE

TECHNICAL FIELD

The present invention relates to an imaging device that is mounted in a vehicle and that is capable of imaging an external world of the vehicle.

BACKGROUND ART

Recently, an imaging device is mounted in a vehicle and utilization of an image imaged thereby is in progress. In a navigation device described in Japanese Patent Application Laid-Open No. 2012-162130, a rearward image in which a rearward environment of a vehicle is imaged is displayed and provided to a driver. In a case of forward parking, a program of causing a mode to display a rearward image to function is preferentially executed compared to a case other than the forward parking.

CITATION LIST

Patent Literature

PTL 1: JP 2012-162130 A

SUMMARY OF INVENTION

Technical Problem

In the above-described navigation device described in Japanese Patent Application Laid-Open No. 2012-162130, it is intended to improve convenience in moving out of a parking space in a backward manner by displaying a rearward image instantaneously at starting after forward parking.

Incidentally, recently, a demand in a market for a crash avoidance safety technology or an autonomous driving technology of a vehicle is increased. As one of technologies to realize this, there is an in-vehicle imaging device generally called a stereo camera. In this stereo camera, it is important to provide a functionality, which contributes to improvement of safety, such as crash avoidance of a vehicle.

In the navigation device described in Japanese Patent Application Laid-Open No. 2012-162130, a functionality of improving convenience, that is, reducing waiting time of a driver by instantaneously displaying a rearward image at starting after forward parking. Also, a basic purpose of the navigation device is to guide the driver, and a functionality, which contributes to improvement of safety, such as crash avoidance of a vehicle is not considered.

A purpose of the present invention is to provide an imaging device capable of quickly providing a functionality contributing to improvement of safety.

Solution to Problem

In order to achieve the above purpose, the present invention includes an imaging unit that performs imaging, a software program storage unit that stores a plurality of software programs, and a start unit that starts each of the plurality of software programs stored in the software program storage unit, wherein at least one of the plurality of software programs is a software program contributing to improvement of safety, and the start unit starts the software program contributing to improvement of safety prior to the others.

Advantageous Effects of Invention

According to the present invention, it is possible to provide an imaging device capable of quickly providing a functionality contributing to improvement of safety.

A problem, configuration, and effect other than what has been described above will be disclosed in a description of the following embodiments.

BRIEF DESCRIPTION OF DRAWINGS

FIG. 7 is a table illustrating an example of a priority table used in the priority determination processing in step 304 in FIG. 3.

DESCRIPTION OF EMBODIMENTS

In the following, an imaging device according to the present invention will be described with reference to the drawings.

Figure 1:
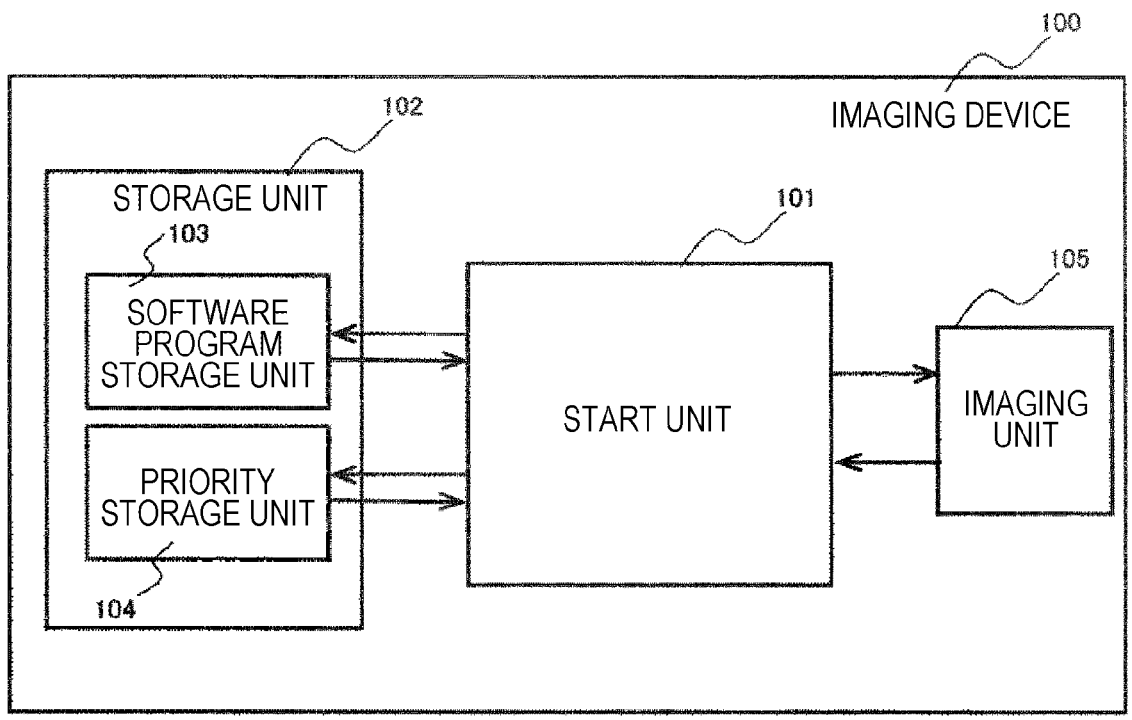
FIG. 1 is a block diagram illustrating a configuration of an imaging device according to one embodiment of the present invention.

FIG. 1 is a block diagram illustrating a configuration of an imaging device according to one embodiment of the present invention.

An imaging device 100 of the present embodiment includes a start unit 101, a storage unit 102, and an imaging unit 105. The storage unit 102 includes a software program storage unit 103 that stores a plurality of software programs, and a priority storage unit 104 that stores a priority table. The priority table is a table in which priority is associated to each of the plurality of software programs stored in the software program storage unit 103. In this priority table, a priority higher than the others is associated to a software program contributing to an improvement of safety among the plurality of software programs stored in the software program storage unit 103. With reference to the priority table stored in the priority storage unit 104, the start unit 101 serially starts the software program from that with high associated priority compared to the others in the priority table.

With such a configuration, it is possible to provide an imaging device capable of quickly providing a functionality contributing to improvement of safety according to the imaging device 100 of the present embodiment.

First Embodiment

In the following, embodiments of an imaging device according to the present invention will be described. Note that in the following embodiments, a case where the imaging device according to the present invention is a stereo camera mounted in a vehicle (not illustrated) will be described. However, the present invention is not limited to this and can be applied to any imaging device.

Generally, in a built-in electronic device including a stereo camera, it is dominant that boot processing is first performed after power activation and then a software program is operated. In the boot processing, processing necessary until execution of an installed software program becomes possible is performed. Sine this processing also exists in a stereo camera, a certain period of time is necessary after power of the stereo camera is activated until a software program is executed. During this period, no software program of the stereo camera is executed, and no functionality contributing to improvement of safety or improvement of comfort of a vehicle can be provided to a driver.

On the other hand, in the present embodiment, boot processing is divided, and boot processing with respect to a software program of a functionality to be provided first (here, functionality contributing to improvement of safety of vehicle) among a plurality of functionalities is executed prior to the others, whereby time after an ignition is turned on until a software program contributing to improvement of safety of a vehicle is started is reduced.

In a case where a software program size is increased along with an increase in functionalities provided by a stereo camera which case is expected in the future, an increase in start time due to all-at-once performance of boot processing with respect to all software programs becomes noticeable. On the other hand, according to the present embodiment, boot processing is divided and only boot processing with respect to a started software program is performed, whereby an influence of a start time increase due to a software program size increase can be reduced.

Figure 2:
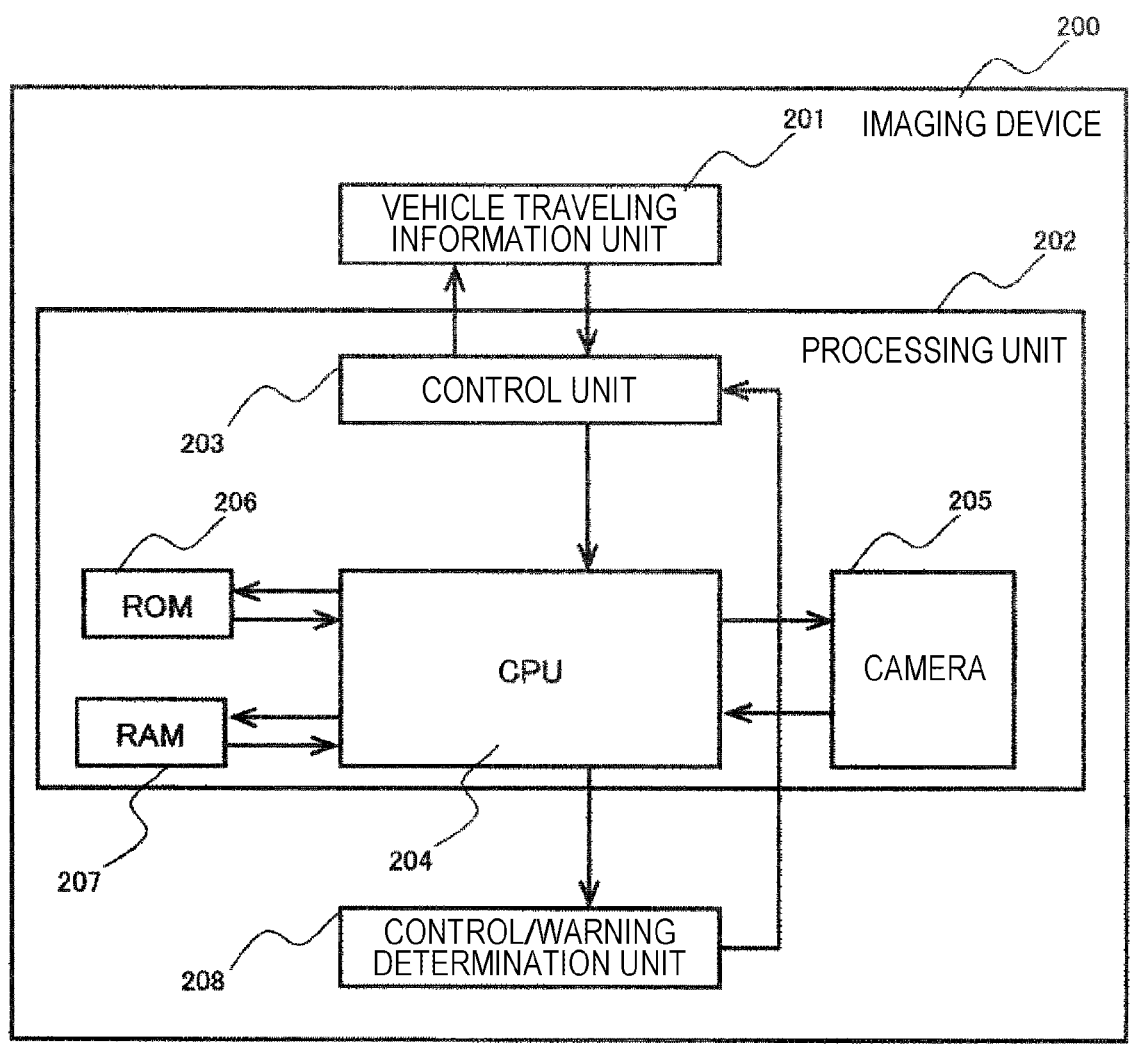
FIG. 2 is a block diagram illustrating a configuration of an imaging device 200 according to a first embodiment of the present invention.

FIG. 2 is a block diagram illustrating a configuration of an imaging device 200 according to the first embodiment of the present invention.

The imaging device 200 is a stereo camera mounted in a vehicle (not illustrated), and provides a functionality contributing to improvement of safety or improvement of comfort of the vehicle to a driver, for example.

The imaging device 200 includes a vehicle traveling information unit 201 that manages a state of own vehicle, a processing unit 202 that executes various kinds of processing operated in the imaging device 200, and a control/warning determination unit 208 that gives a warning to a driver, for example. Based on information acquired from the vehicle traveling information unit 201, the processing unit 202 detects and determines a situation of a road, executes processing, and provides each functionality.

As a functionality provided by the processing unit 202 of the imaging device 200, there is a functionality contributing to improvement of safety and there is a functionality contributing to improvement of comfort. The processing unit 202 includes a camera 205 that can image an external world of an own vehicle, a control unit 203 that transmits the information from the vehicle traveling information unit 201 to a CPU 204, the CPU 204 that starts and executes various software programs, a ROM 206 that stores the various software programs executed by the CPU 204, and a RAM 207 in which the various software programs stored in the ROM 206 are expanded in the boot processing.

An access rate of the CPU 204 with respect to the RAM 207 is higher than an access rate of the CPU 204 with respect to the ROM 206. Thus, in the present embodiment, for performance improvement, a software program of each functionality is expanded from the ROM 206 to the RAM 207 (boot processing) at a start, a program region of the RAM 207 is read, and the software program of each functionality is executed. Note that, a start of a software program may indicate performing boot into an executable state, or may indicate actual execution.

An image acquired by the camera 205 (imaged image) is used, for example, as information to detect and determine an obstacle in traveling, the obstacle including a person or a different vehicle, a white line, a road shoulder, a sign, a traffic light, or a road state such as a curve. Also, the vehicle traveling information unit 201 acquires information from the outside of the imaging device 200, and outputs this to the control unit 203 as information indicating an own vehicle state. The CPU 204 acquires this information indicating an own vehicle state through the control unit 203. As an example of the information indicating an own vehicle state, there is information such as velocity or a steering angle of an own vehicle, information indicating an external or in-vehicle temperature acquired by a thermometer (not illustrated), own vehicle position information that is a current position of the own vehicle which position is acquired by a GPS (not illustrated), or the like.

Figure 3:
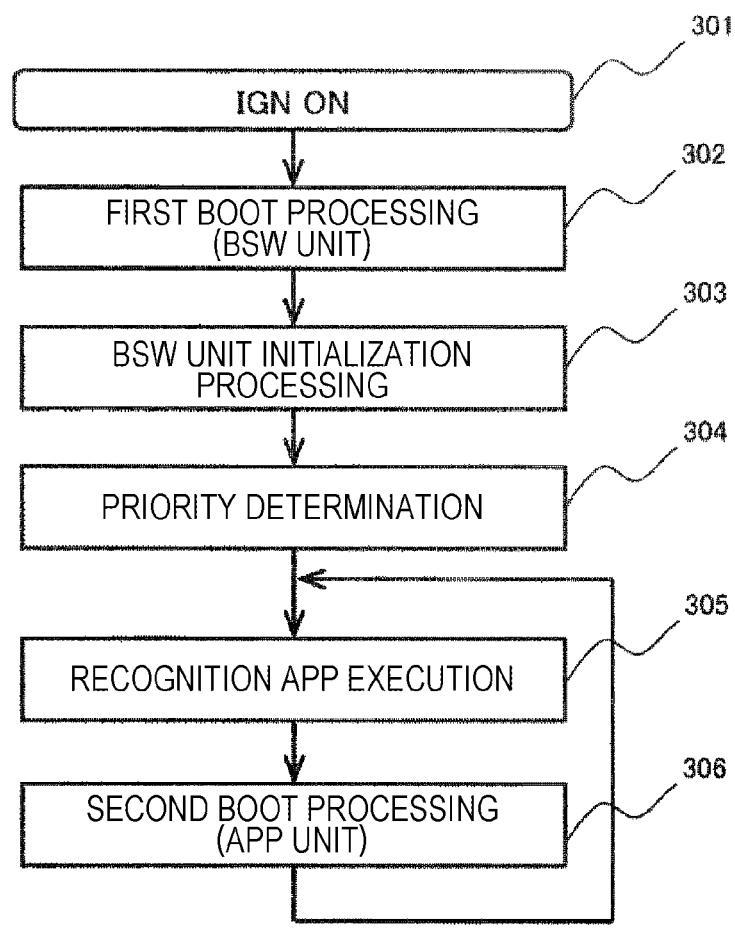
FIG. 3 is a flowchart illustrating an operation of the imaging device 200 according to the first embodiment of the present invention.

FIG. 3 is a flowchart illustrating an operation of the imaging device 200 according to the first embodiment of the present invention and illustrating a start processing sequence in the first embodiment.

In step 301, an ignition of an own vehicle is turned on and the power of the imaging device 200 is activated.

Subsequently, first boot processing is performed in step 302. In this first boot processing, basic software (BSW) (premise basic software program for execution of software program in upper layer) is booted. That is, a software program of the BSW is expanded from the ROM 206 to the RAM 207.

Subsequently, initialization processing of the BSW is executed in step 303.

Subsequently, priority with respect to start order of each functionality is determined in step 304.

Subsequently, as main loop processing, a loop of recognition app execution (execution of software program which include BSW and boot of which is over) in step 305 and second boot processing (boot of one with highest priority among software program other than BSW) in step 306 is performed based on the priority determined in step 304. Here, in the present embodiment, the priority determination processing (step 304) is performed before the app execution. In this priority determination processing, external information is acquired sporadically or integrally from any means (such as camera 205 or vehicle traveling information unit 201), and processing of increasing/decreasing priority originally determined for each functionality (predetermined priority table) according to a condition (processing of updating priority table) is performed.

Also, while conventional general boot processing is performed once, boot processing is divided into two stages in the present embodiment. In first boot processing, only a start of a BSW unit is performed, and a recognition functionality of an application unit is started (software program is started) in order of the determined priority in second boot processing. Also, a functionality, start processing of which is over, can be sequentially and periodically executed (executed by timer interruption or the like, for example). Functionalities to be executed are activated in the order from a program with high set start priority. At a time point at which start processing of the all is over, all functionalities are finally executed periodically. In the following, a start sequence will be described in further detail.

In the first boot processing in step 302, only a program for the BSW is expanded from the ROM to the RAM. Also, in the second boot processing in step 306, a mechanism that expands a program of the app unit from a ROM 203 to the RAM 207 and that can notify the recognition app execution processing that execution of an expanded functionality becomes possible is included.

The priority determination processing in step 304 will be described in further detail with reference to FIG. 4.

Figure 4:
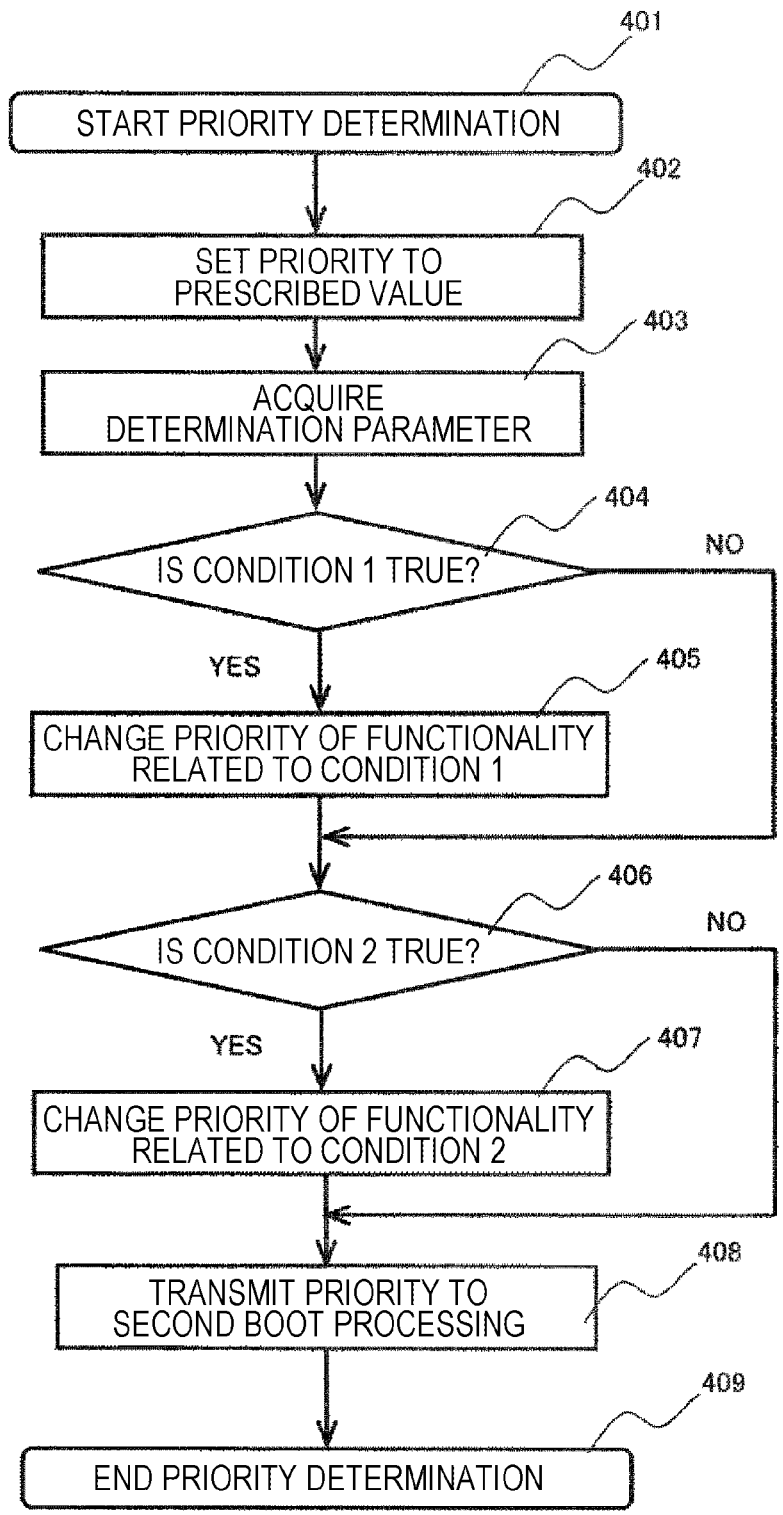
FIG. 4 is a flowchart illustrating a detail of priority determination processing in step 304 in FIG. 3.

FIG. 4 is a flowchart illustrating a detail of the priority determination processing in step 304 in FIG. 3.

Also, an example of a priority table used in the priority determination processing in step 304 in FIG. 3 is illustrated in FIG. 7. The priority table of the example in FIG. 7 is a table associating priority of each of software programs that realize functionalities of a functionality 1, a functionality 2, a functionality 3, a functionality 4, a functionality 5, and a functionality 6 provided by the imaging device 200, a smaller numerical value of the priority indicating higher priority.

In step 402 in FIG. 4, priority of each functionality is set to a prescribed value (such as default value or value acquired by subtraction of 6 or addition of 2 from/to default value based on priority definition information in FIG. 7). In the example in FIG. 7, a priority default value is "1" with respect to each of the functionalities 1 to 6 but may vary depending on a functionality. For example, priority of a functionality with a small software program size may be higher than that of a functionality with a large size.

In the table in FIG. 7, management information and a priority increased/decreased condition with respect to each functionality are held. For example, in the CPU 204, a vehicle state at a start is determined from external information such as an imaged image (including luminance information of external world, for example) imaged by the camera 205 or information (including external or in-vehicle temperature information, and own vehicle position information that is current position of own vehicle, for example) acquired from the vehicle traveling information unit 201 (step 403). From the determined vehicle state, an increased/decreased value of priority in each management information item is determined (steps 404 and 406). Priority of each functionality is determined by addition of a default value of the priority and calculated increased/decreased values of all items (steps 405 and 407). After priority is determined with respect to all functionalities, initialization is performed in order from a functionality to which a small numerical value of the priority is assigned (step 408, and step 306 in FIG. 3). Note that in the flowchart in FIG. 4, only two conditions that are a condition 1 and a condition 2 are determined in steps 404 and 406. However, the present invention is not limited to this. For example, in the example in FIG. 7, determination is made with respect to each of nine conditions that are "whether a functionality is necessary for a system operation of a stereo camera," "whether a functionality is essential for accident prevention/whether a functionality is for comfortable driving," "whether a functionality works during traveling or whether a functionality works during stoppage," "whether a functionality does not need to be performed in a case where temperature is in a prescribed range," "whether a functionality works during the day or whether a functionality works at night," "whether a functionality is necessary when it is foggy/rainy," "whether processing does not need to be performed when there is no noise in an image," "whether a functionality can have low priority when obstacle information stored in previous driving is valid," and "whether a functionality can have low priority when sign information stored in previous driving is valid," and a numerical value of priority is increased/decreased. In a case where a value acquired by subtraction of 6 or addition of 2 from/to a default value based on the priority definition information in FIG. 7 is a prescribed value, determination is made with respect to each of seven conditions other than the priority definition information in FIG. 7, and a numerical value of the priority is increased/decreased.

In the following, a detailed example of management information will be described.

First, information such as whether a functionality is necessary for an operation in a system (becomes premise of each functionality of imaging device 200, for example), whether a functionality is essential for accident prevention (such as functionality contributing to improvement of safety), or whether a functionality is for comfortable driving (such as functionality contributing to improvement of comfort) is previously defined as priority definition information for each functionality.

In a case where a functionality is necessary for an operation in a system, to give the highest priority to a start thereof, setting to lower start priority of the corresponding functionality is performed (−6 is added to numerical value of priority in FIG. 7).

Also, to secure safety of a driver, the highest priority is given to prevention of accidental contact at the time of stoppage. Priority of a functionality that is related to comfortable traveling and that is not essential for securing safety is lowered (+2 is added to numerical value of priority in FIG. 7).

Also, processing of dynamically adjusting priority according to whether it is during the day or night, or an external condition such as velocity measured at a start (performing update based on external information) in the priority determination processing will be described. This processing is executed after setting of a prescribed value of priority (step 402). Information of external recognition (external information) is acquired in the processing in step 403, and setting of start priority of each functionality is changed in step 404, 405, 406, and 407. As a detailed example of a condition, setting is performed in such a manner that priority of a functionality that is specifically for the night and that becomes effective during the night becomes low in a case where determination is made that it is during the day at a start, for example, from an imaged image or luminance information. Also, in a case where it is determined that an in-vehicle temperature is not high, setting is performed in such a manner that priority of a functionality that does not need to be performed at ordinary temperature becomes low. Note that in FIG. 7, a field of a "state" indicates a current state of a vehicle.

In the example in FIG. 7, since the functionality 1 is a functionality that only works during traveling, "traveling" is in a field indicating "whether a functionality works during traveling." In a case where it is determined that a vehicle is stopped, the "state" becomes "stopped." Thus, a "case of being stopped (traveling: +3)" of a priority increased/decreased condition is applied. Thus, an applied value is (+3) in the field of "traveling." The other management information items are also added, and a final priority determination result of the functionality 1 becomes (default value: 1)+(+3)=+4. Thus, a value of the priority determination result (numerical value of priority) becomes 4 in total. At the start, the start is performed in ascending order of a numerical value of priority. Since the numerical value of the priority of the functionality 1 is the third smallest value compared to the other functionalities in the example in FIG. 7, start order of the functionality 1 is the third.

In step 408, the determined priority is notified to the second boot processing in step 306 in FIG. 3. Accordingly, it is made possible for the CPU 204 to expand each functionality program from the ROM 206 to the RAM 207 in the designated order (order of priority).

In step 305 in FIG. 3, only a software program of an executable functionality notified by the second boot processing (step 306) is executed as a usable recognition app. As the number of software programs executable notice of which is given is increased, the number of software programs executed in this processing in step 305 is serially increased.

In the second boot processing in step 306 in FIG. 3, a software program of a functionality with the highest priority is expanded from the ROM 206 to the RAM 207 and is brought into an executable state. At a time point at which this expansion processing is over, notice indicating that a functionality the expansion processing of which is over is executable is given, and a periodic operation of the software program is started by a recognition app execution unit in step 305.

By the above processing operation, the number of items to be prepared before a minimum functionality necessary for protection of safety of a driver is executed becomes smaller. Thus, it becomes possible to start execution of the functionality in a period reduced from that of a conventional start process. Accordingly, it becomes possible to more accurately prevent an accident that may be caused immediately after an engine of a vehicle is started.

Second Embodiment

Figure 5:
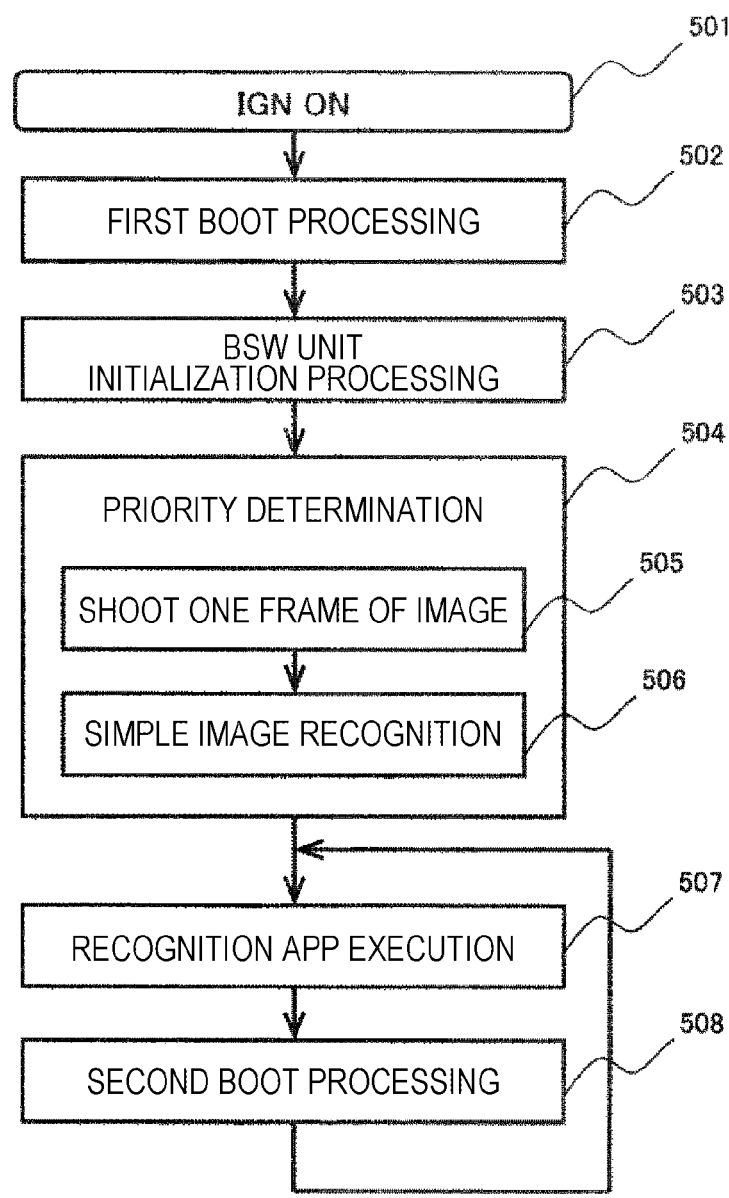
FIG. 5 is a flowchart illustrating an operation of an imaging device 200 according to a second embodiment of the present invention.

FIG. 5 is a flowchart illustrating an operation of an imaging device 200 according to a second embodiment of the present invention.

This second embodiment is an embodiment indicating a different example of priority determination in step 304 in FIG. 3. The other parts are similar to those of the first embodiment, and a description of the similar parts is omitted. Steps 501 to 503 in FIG. 5 are similar to steps 301 to 303 in FIG. 3, and steps 507 and 508 in FIG. 5 are similar to steps 305 and 306 in FIG. 3.

Priority determination in step 504 in FIG. 5 has steps 505 and 506. In step 505, an image is acquired (imaged) once by the camera 205 during the priority determination (for example, as determination parameter acquisition processing performed in 403 in FIG. 4).

In step 406, simple image recognition is performed based on the image imaged in step 405. As an example of determination of information by the image recognition, there is determination of an external situation such as whether it is rainy, it is foggy, or it is during the night. Determination whether a camera automatic adjustment functionality is necessary, that is, whether a noise or an optical axis deviation is generated in an image is also possible. From the determined information, priority of a functionality necessary for the situation is increased. For example, in a case where it is determined that an external world is during the night by an analysis of the image imaged once, by increasing of priority of a functionality to perform light distribution control or a detection functionality specifically for the night, a change may be made in such a manner that the functionality is provided faster than a case where determination is made that it is during the day.

Also, in a case where determination is made that it is rainy by an analysis of the image imaged once, priority of a functionality to remove a raindrop by operating a wiper may be increased.

Moreover, in a case where no noise or optical axis deviation is recognized in the imaged image, execution of the automatic adjustment functionality may be omitted and priority may be given to execution of a different functionality.

Third Embodiment

Figure 6:
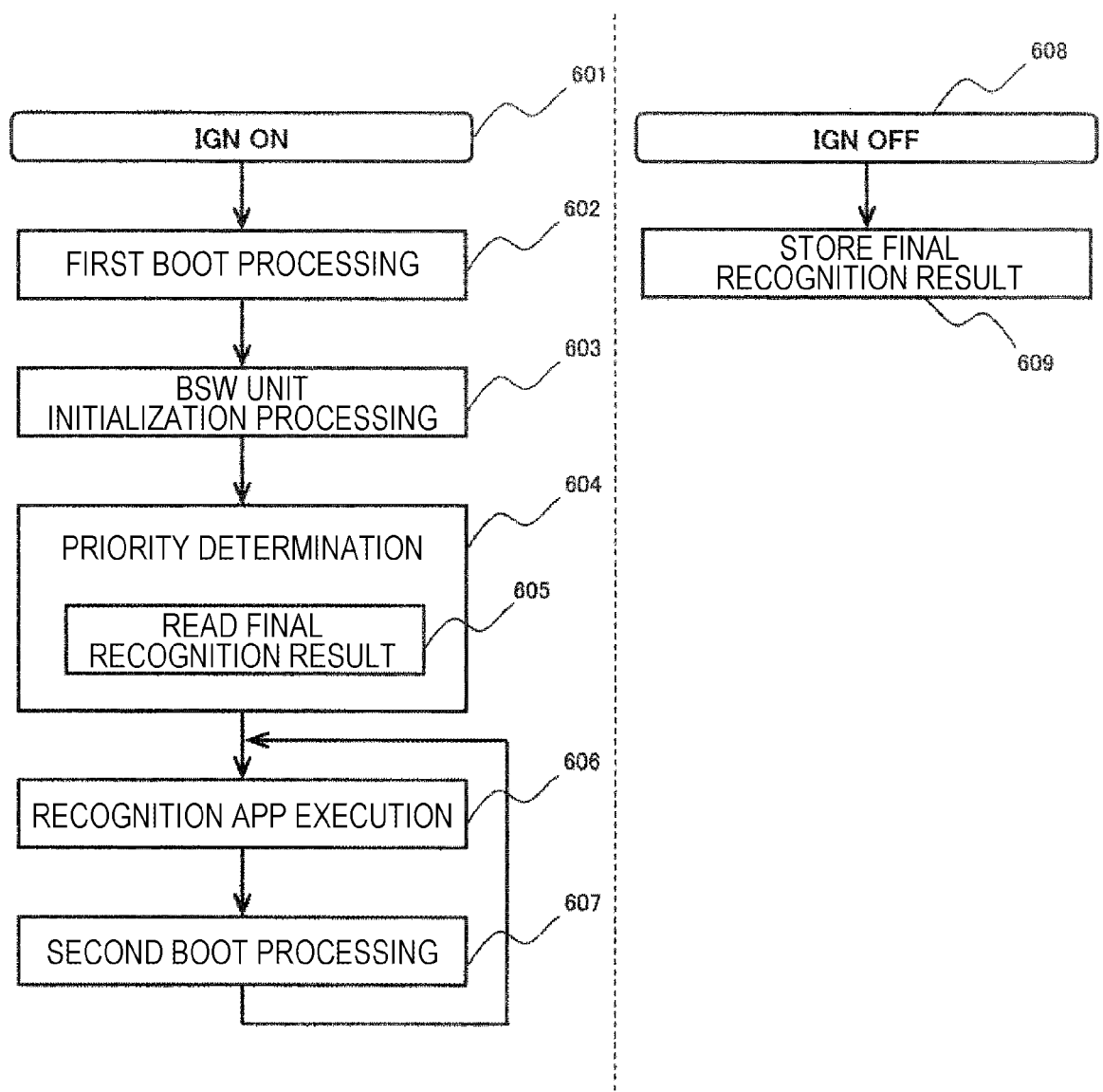
FIG. 6 is a flowchart illustrating an operation of an imaging device 200 according to a third embodiment of the present invention.

FIG. 6 is a flowchart illustrating an operation of an imaging device 200 according to the third embodiment of the present invention.

This third embodiment is an embodiment indicating a different example of priority determination in step 304 in FIG. 3. The other parts are similar to those of the first embodiment, and a description of the similar parts is omitted. Steps 601 to 603 in FIG. 6 are similar to steps 301 to 303 in FIG. 3, and steps 606 and 607 in FIG. 6 are similar to steps 305 and 306 in FIG. 3.

Priority determination in step 604 in FIG. 6 has step 605. In the present embodiment, in a case where driving is ended and an ignition is turned off as illustrated in step 608, an imaged image in a final frame of an imaged image by a camera 205 or information of an object recognition result is stored into a storage device (for example, that only need to be non-volatile storage device and may be ROM 206 or RAM 207) in step 609.

When the ignition is turned on next time, in a case where it is determined in the priority determination processing in step 604 that a vehicle position is not changed, an imaged image or a final recognition result at the end of the previous driving which image or result is stored in step 609 is read before priority determination and reused in step 605. Thus, in the priority determination processing in step 604, by decreasing priority of a functionality that needs to be started for recognition when reusing is not performed but that does not need to be started immediately since reusing is performed, it is possible to preferentially start a different recognition functionality. For example, in a case where a sign is detected immediately before a vehicle is stopped, information of the sign is recorded when the ignition is off. When the ignition is turned on at a start of next driving, a position of a sign or a structure should be seen without a change in a case where a vehicle position is not changed from the time of stoppage. That is, it is not necessary to perform recognition processing of this again for a several seconds after the camera is started, and it is possible to make a functionality work in a pseudo manner by reusing the stored recognition result instead. Thus, by decreasing priority of a sign recognition functionality and preferentially starting a different recognition functionality, it is possible to more quickly start an operation of a necessary functionality.

<First Additional Statement>

Note that there is a case where a functionality contributing to improvement of safety is a functionality to prevent a crash of a vehicle, or a functionality to suppress an erroneous start of the vehicle.

Note that software programs stored in a storage unit 102 may be sorted based on priority. Software programs are expanded in order based on priority when being expanded from a ROM 206 to a RAM 207 by boot processing, whereby there is a case where the software programs are in a state sorted based on the priority in the RAM 207.

<Second Additional Statement>

Note that since the present invention described above is 1. an imaging device including: an imaging unit (such as imaging unit 105 or camera 205) that performs imaging; a software program storage unit (such as storage unit 102, software program storage unit 103, ROM 206, or RAM 107) that stores a plurality of software programs; and a start unit (such as start unit 101 or CPU 204) that starts each of the plurality of software programs stored in the software program storage unit, wherein at least one of the plurality of software programs is a software program contributing to improvement of safety, and the start unit starts the software program contributing to improvement of safety prior to the others, an imaging device that can quickly provide the functionality contributing to improvement of safety can be provided.

Also, since the present invention is 2. the imaging device according to 1., further including a priority storage unit (such as storage unit 102, priority storage unit 104, ROM 206, or RAM 107) that stores a priority table in which priority is associated to each of the plurality of software programs and priority higher than those of the others is associated to the software program contributing to improvement of safety, wherein the start unit starts the plurality of software programs serially from a software program to which priority higher than those of the others is associated in the priority table, there is a case where setting of the priority can be performed easily with the priority table.

Also, since the present invention is 3. the imaging device according to 2., wherein the imaging device is a device mounted in a vehicle, and the priority table is a table that stores priority about order of starting each of the plurality of software programs after an ignition is turned on, there is a case where the functionality contributing to improvement of safety can be provided quickly after the ignition is turned on.

Also, since the present invention is 4. the imaging device according to 3., wherein the priority storage unit stores a plurality of kinds of the priority tables, and the start unit selects one of the plurality of kinds of priority tables and determines the order of starting each of the plurality of software programs by using the selected priority table, there is a case where it is possible to respond to a plurality of patterns without changing setting of the priority each time through preparation of the plurality of priority tables.

Also, since the present invention is 5. the imaging device according to 3., further including an external information acquisition unit (such as imaging unit 105, camera 205, or vehicle traveling information unit 201) that acquires external information that is information of an external world of the vehicle, and a priority table updating unit (such as CPU 204) that updates the priority table based on the external information, the priority table can be updated, and there is a case where optimal priority can be set based on the external information.

Also, since the present invention is 6. the imaging device according to 5., wherein the external information acquisition unit is the imaging unit, and the external information is an imaged image that is imaged by the imaging unit, there is a case where optimal priority can be set based on the imaged image.

Also, since the present invention is 7. the imaging device according to 6., further including an off-time image storage unit (such as storage unit 102, ROM 206, or RAM 107) that stores an off-time image, which is an image of when the ignition is turned off, in the imaged image that is imaged by the imaging unit, wherein the external information is the off-time image stored in the off-time image storage unit, there is a case where it is not necessary to wait until imaging becomes possible after the ignition is turned on this time by utilization of the off-time image and a functionality contributing to improvement of off-safety can be more quickly provided.

Also, since the present invention is 8. the imaging device according to 5., wherein the external information is at least any one piece of information among luminance information of the external world of the vehicle, external or in-vehicle temperature information of the vehicle, and own vehicle position information that is a current position of the vehicle, there is a case where optimal priority can be set based on the luminance information of the external world of the vehicle, the external temperature information of the vehicle, or the own vehicle position information that is a current position of the vehicle.

Also, since the present invention is 9. the imaging device according to 3., wherein the plurality of software programs includes a first initialization program (such as first boot processing in step 302 or BSW unit initialization processing in step 303) to initialize a basic software program, the plurality of software programs includes a plurality of second initialization programs (such as second boot processing in step 306) to respectively initialize software programs other than the basic software program among the plurality of software programs, and after starting one of the plurality of second initialization programs based on the priority table, the start unit starts a software program initialized by the started second initialization program, there is a case where the functionality contributing to improvement of safety can be provided quickly in a configuration having the basic software program.

Also, since the present invention is 10. the imaging device according to 3., wherein in a case where there is a plurality of software programs to which identical priority is associated in the priority table, the start unit starts a software program with a smaller capacity first among the plurality of software programs, there is a case where the functionality contributing to improvement of safety can be provided more quickly since a period of time necessary for boot processing is shorter in a software program with a smaller capacity.

Also, since the present invention is 11.
the imaging device according to 3.,
wherein at least one of the plurality of software programs is a software program contributing to improvement of comfort, and
the start unit starts the software program contributing to improvement of safety prior to the software program contributing to improvement of comfort,
there is a case where the functionality contributing to improvement of safety can be provided more quickly.

Note that the present invention is not limited to the above-described embodiments and various modification examples are included. For example, the above-described embodiments are described in detail to describe the present invention in an easily-understood manner. Not all of the above-described configurations are necessarily included. Also, the present invention includes any combination of elements in the above-described embodiments.

REFERENCE SIGNS LIST 100 imaging device
101 start unit
102 storage unit
103 software program storage unit
104 priority storage unit
105 imaging unit
200 imaging device
201 vehicle traveling information unit
202 processing unit
203 control unit
204 CPU
205 camera
206 ROM
207 RAM
208 control/warning determination unit

The invention claimed is:

1. An imaging device comprising:
a central processing unit (CPU);
an imaging unit that performs imaging,
  wherein the imaging device is a device mounted in a vehicle, and
  wherein the imaging unit images an image of an environment external to the vehicle,
    wherein the imaging unit images the image when an ignition of the vehicle is in an off state; and
a memory storing:
  a software program storage unit that stores a plurality of software programs; and
  a priority storage unit that stores a priority table in which a priority is associated to each of the plurality of software programs and a priority higher than priorities of the other software programs of the plurality of software programs is associated to a software program contributing to an improvement of safety,
    wherein the priority table is a table that stores priority about an order of starting each of the plurality of software programs after the ignition is turned on;
wherein the CPU starts each of the plurality of software programs stored in the software program storage unit in an order corresponding to the stored priorities,
wherein the CPU:
  sets the priorities of the plurality of software programs according to the stored priorities in the priority table responsive to the ignition turning on;
  executes image recognition techniques on the image when the ignition is in the off state,
  determines, after the ignition is turned on, a position of the vehicle has not changed from when the imaging unit imaged the image;
  determines whether the image of the external environment satisfies a condition based at least on (1) the determination that the position of the vehicle has not changed, and (2) the execution of the image recognition techniques occurring when the ignition was in the off state;
  responsive to determining the image satisfies the condition, updates the set priorities according to the satisfied condition by decreasing a priority of an image processing software program of the plurality of software programs; and
  serially executes the plurality of software programs in an updated order corresponding to the updated set priorities, and
  wherein the CPU starts the software program contributing to an improvement of safety prior to the other software programs of the plurality of software programs.

2. The imaging device according to claim 1, wherein the CPU further determines whether the image of the external environment satisfies the condition by:
  determining an external situation using an image recognition technique; and
  wherein the CPU updates the set priorities according to the external situation.

3. The imaging device according to claim 2, wherein the CPU determines the external situation using image recognition techniques by determining a current state of the external environment is night; and
  wherein the CPU updates the set priorities by increasing a priority of a software program that corresponds to light distribution control.

4. The imaging device according to claim 1,
  wherein the priority storage unit stores a plurality of kinds of the priority tables, and
  the CPU selects one of the plurality of kinds of priority tables and determines the order of starting each of the plurality of software programs by using the selected priority table.

5. The imaging device according to claim 1, wherein the CPU further acquires external information that is information of an external world of the vehicle.

6. The imaging device according to claim 5, wherein
  the external information is a second imaged image that is imaged by the imaging unit.

7. The imaging device according to claim 5,
  wherein the external information is at least any one piece of information among luminance information of the external world of the vehicle, temperature information of the external world of the vehicle, and own vehicle position information that is a current position of the vehicle.

8. The imaging device according to claim 1,
  wherein the plurality of software programs includes a first initialization program to initialize a basic software program,
  the plurality of software program includes a plurality of second initialization programs to respectively initialize software programs other than the basic software program among the plurality of software programs, and after starting one of the plurality of second initialization programs based on the priority table, the CPU starts a software program initialized by the started second initialization program.

9. The imaging device according to claim 1,
wherein in a case where there is a plurality of software programs to which identical priority is associated in the priority table, the CPU starts a software program with a smaller capacity first among the plurality of software programs.

10. The imaging device according to claim 1,
wherein at least one of the plurality of software programs is a software program contributing to improvement of comfort, and
the CPU starts the software program contributing to improvement of safety prior to the software program contributing to improvement of comfort.

\* \* \* \* \*